United States Patent [19]
Garris et al.

[11] Patent Number: 5,710,406
[45] Date of Patent: Jan. 20, 1998

[54] DEODORIZING CIGARETTE LIGHTER

[76] Inventors: Louie G. Garris, Rte. 1, P.O. Box 244, St. Mary, Mo. 63673; Jerry J. Garris, Rte. 6 Box 12, Perryville, Mo. 63775

[21] Appl. No.: 631,064

[22] Filed: Apr. 12, 1996

[51] Int. Cl.[6] .................................................. F23Q 7/22
[52] U.S. Cl. ........................... 219/267; 219/270; 392/386
[58] Field of Search ............................... 219/260–270; 392/386, 390, 393, 391

[56] References Cited

U.S. PATENT DOCUMENTS

| | | |
|---|---|---|
| 2,898,649 | 8/1959 | Murray ................................. 392/393 |
| 3,006,042 | 10/1961 | Calandra . |
| 3,551,092 | 12/1970 | Masson . |
| 3,870,857 | 3/1975 | Horwitt et al. . |
| 3,872,280 | 3/1975 | Van Dalen . |
| 4,574,181 | 3/1986 | Spector . |
| 4,686,353 | 8/1987 | Spector . |
| 4,692,590 | 9/1987 | Spector . |
| 4,731,521 | 3/1988 | Spector et al. . |
| 5,394,506 | 2/1995 | Stein et al. . |
| 5,424,049 | 6/1995 | Giolitti et al. . |
| 5,432,882 | 7/1995 | Glynn . |

*Primary Examiner*—Teresa J. Walberg
*Assistant Examiner*—Raphael Valencia
*Attorney, Agent, or Firm*—Polster, Lieder, Woodruff & Lucchesi

[57] ABSTRACT

A deodorizing cigarette lighter is disclosed for use in a motor vehicle. A cigarette igniting unit having a standard conventional structure is used to store a heat responsive, nonflammable deodorizing agent that emits a fragrant vapor into the vehicle interior upon energization of an electric heating element associated with the lighter. The cigarette lighter includes a tubular plug body having a chamber formed therein that is used to retain the deodorizing agent. A slotted cap is attached to one end of the plug body, and a knob is attached to the cap. The lighter also includes a contact cup at the other end of the plug body that houses the heating coil. One end of the heating element is maintained in thermal communication with the contact cup, and the other end of the heating element is connected to a thermally conductive rivet. The rivet is maintained in a heat transfer relationship with the plug body. The deodorizing agent emits a fragrant vapor upon energization of the heating element. Passages exist between the plug body and cap which allow for vapors to exude from the chamber. Vapors then can flow through a vented friction sleeve slidably carried on the plug body after the heating element is heated to a red glow. The lighter also includes an ashguard that is telescopically engaged with the vented friction sleeve. The ashguard has stop means formed therein which restricts outward axial retraction of the friction sleeve after the heating coil is energized.

20 Claims, 4 Drawing Sheets

DEODORIZING CIGARETTE LIGHTER

BACKGROUND OF THE INVENTION

This invention relates to electric cigarette lighters used in motor vehicles, and in particular to cigarette lighters containing a heat activated deodorizing agent which releases a pleasant aromatic scent into the passenger compartment of the vehicle when the heating coil associated with the cigarette lighter is energized.

Deodorizers are widely used in motor vehicles to mask or eliminate unpleasant odors and provide a fragrant scent. Such deodorizers are available in various embodiments, including electrically heated devices which operate when inserted into a motor vehicle cigarette lighter socket. For example, U.S. Pat. No. 5,432,882 which issued Jul. 11, 1995 to J. M. Glynn discloses an electrically heated deodorizer device adapted for insertion into a cigarette lighter socket. The Glynn device employs power control circuitry to selectively energize an internal heating unit to continuously or intermittently evaporate a deodorizer agent at predetermined intervals. This invention is designed to replace a conventional automobile lighter, and to discourage smoking in the vehicle since the Glynn device cannot be used as a cigarette lighter. Similar deodorizers electrically heated via a motor vehicle cigarette lighter socket are set forth in U.S. Pat. Nos. 5,394,506, issued Feb. 28, 1995, to Stein et al.; and 3,006,042, issued Oct. 31, 1961 to F. M. Calandra.

Other known automobile deodorizer devices that also are adapted to function as cigarette lighters are illustrated in U.S. Pat. Nos. 4,574,181, 4,686,353, and 4,692,590, all of which issued to Donald Spector, as well as U.S. Pat. No. 4,731,521, which issued to Spector et al. However, to accommodate and activate the deodorizing agent, the structure of each Spector device deviates significantly (in varying configurations) from that of a conventional, modern cigarette lighter such as shown in U.S. Pat. No. 3,870,857 that issued Mar. 11, 1975 to Horwitt et al. For example, the '181 patent appears to require special structures for the knob and apertured plunger to accommodate a replaceable tubular fragrance cartridge. The aroma generating cigarette lighter disclosed in the '353 patent also requires a unique design for the plunger and knob to allow for the insertion of a heat responsive, aroma generating element therein. Similarly, the '521 patent appears to require special configuration of the knob to retain a slab of scent-releasing material. The '521 patent also requires addition of a thermally conductive rivet extension to transfer heat from the heating coil to the slab stored in the knob, thereby causing the release of fragrant vapors into chambers and troughs associated with the redesigned knob. Likewise, the '590 device requires an unusual design of the knob to accommodate an aroma generating element within a cartridge disposed therein, and additional components not found in a conventional lighter, such as a thermally conductive electrode rod extending from the heating coil to the knob to activate the aroma generating element when the heating coil is energized.

The structure of each patented Spector devices requires changes to manufacturing or tooling processes to produce a lighter which deviates from standard, conventional design. Other deodorizing cigarette lighters set forth in U.S. Pat. Nos. 5,424,049, issued Jun. 13, 1995, to Giolitti et al., and 3,551,092, issued Dec. 29, 1970 to L. Masson also require unique structures and special molded or retooled parts that are not present in a conventional lighter. Expenses associated with manufacturing changes account for a significant part of the cost of such deodorizing cigarette lighters.

Therefore, it is desirable to develop an improved deodorizing cigarette lighter that does not require any modifications or alternations to the structure of conventional, modern cigarette lighters to accommodate and activate deodorizing agents stored therein. Such a device should be as reliable and durable as conventional motor vehicle lighters, and capable of emitting aromic vapors over an extended period of time through multiple cycles of operation. Moreover, the deodorizing cigarette lighter preferably should be easily and inexpensively manufactured.

SUMMARY OF THE INVENTION

Accordingly, one object of the present invention is to provide a new and improved deodorizing cigarette lighter that is inexpensively and easily manufactured, with no manufacturing changes that would necessitate retooling or remolding of any components associated with a conventional cigarette lighter.

Another object of this invention is to provide an improved deodorizing cigarette lighter that is reliable in operation over an extended period of time.

Another object of this invention is to provide an improved deodorizing cigarette lighter that takes advantage of the structure of a conventional motor vehicle cigarette lighter to allow for improved storage of deodorizing agents therein.

Still another object of this invention is to provide an improved deodorizing cigarette lighter that takes advantage of the structure and operation of a conventional motor vehicle cigarette lighter to allow for improved heating and ventilation of the deodorizing agents stored therein.

Another object of this invention is to provide an improved deodorizing cigarette lighter that takes advantage of the structure of a conventional motor vehicle cigarette lighter to allow the user to vary the extent of deodorizing vapor emissions and rate of ventilation of the deodorizing agent by adjusting the position of the friction sleeve with respect to the lighter ashguard.

Yet another object of this invention is to provide an improved deodorizing cigarette lighter wherein the deodorant can be inserted in the plug body of the lighter during manufacture, or by unscrewing the knob of a fully assembled lighter, inserting the deodorant through an opening in the cap secured to the plug body, and then reattaching the knob.

These and other objects and advantages will become apparent to those skilled in the art in light of the following disclosure and accompanying drawings.

In accordance with the invention, generally stated, a deodorizing cigarette lighter is disclosed that includes a cigarette igniting unit having a standard conventional structure including a plug body and an electric heating element disposed at one end of the body. The heating element is maintained in a heat transfer relationship with the plug body upon energization of the heating element. The deodorizing cigarette lighter further includes a heat responsive, nonflammable deodorant stored inside the plug body such that the deodorant is maintained in a heat transfer relationship with the plug body. The deodorant emits a fragrant vapor upon energization of the heating element.

Another aspect of the present invention is of a deodorizing cigarette lighter including a tubular plug body having a transverse end wall, a cylindrical side wall extending axially outwardly from the end wall so as to define a chamber therebetween, and at least two lugs extending axially outwardly from the side wall. A cap is further provided that has at least two slots formed therein adapted for receiving a portion of the lugs therethrough. The portion of the lugs received through the slots are bent over upon assembly of the lighter to attach the cap to the plug body. The deodorizing cigarette lighter also includes a knob attached to the cap, and a contact cup aligned with the end wall of the plug body. The contact cup is electrically insulated from the plug body. A heating coil is disposed inside the contact cup. The invention further includes thermally conductive means connected to one end of the heating coil for transferring heat from the heating coil to the plug body upon energization of the heating coil. A vented friction sleeve is slidably carried on the plug body, and an ashguard is telescopically engaged with the friction sleeve. The device further includes a heat responsive, nonflammable deodorant disposed inside the chamber associated with the plug body. The deodorant is maintained in a heat transfer relationship with the plug body.

Other objects and features will be apparent and in part pointed out hereinafter.

BRIEF DESCRIPTION OF THE DRAWINGS

The objects of the invention are achieved as set forth in the illustrative embodiments shown in the drawings which form a part of the specification.

Corresponding reference characters indicate corresponding parts throughout the several views of the drawings.

DESCRIPTION OF THE PREFERRED EMBODIMENT

Figure 1:
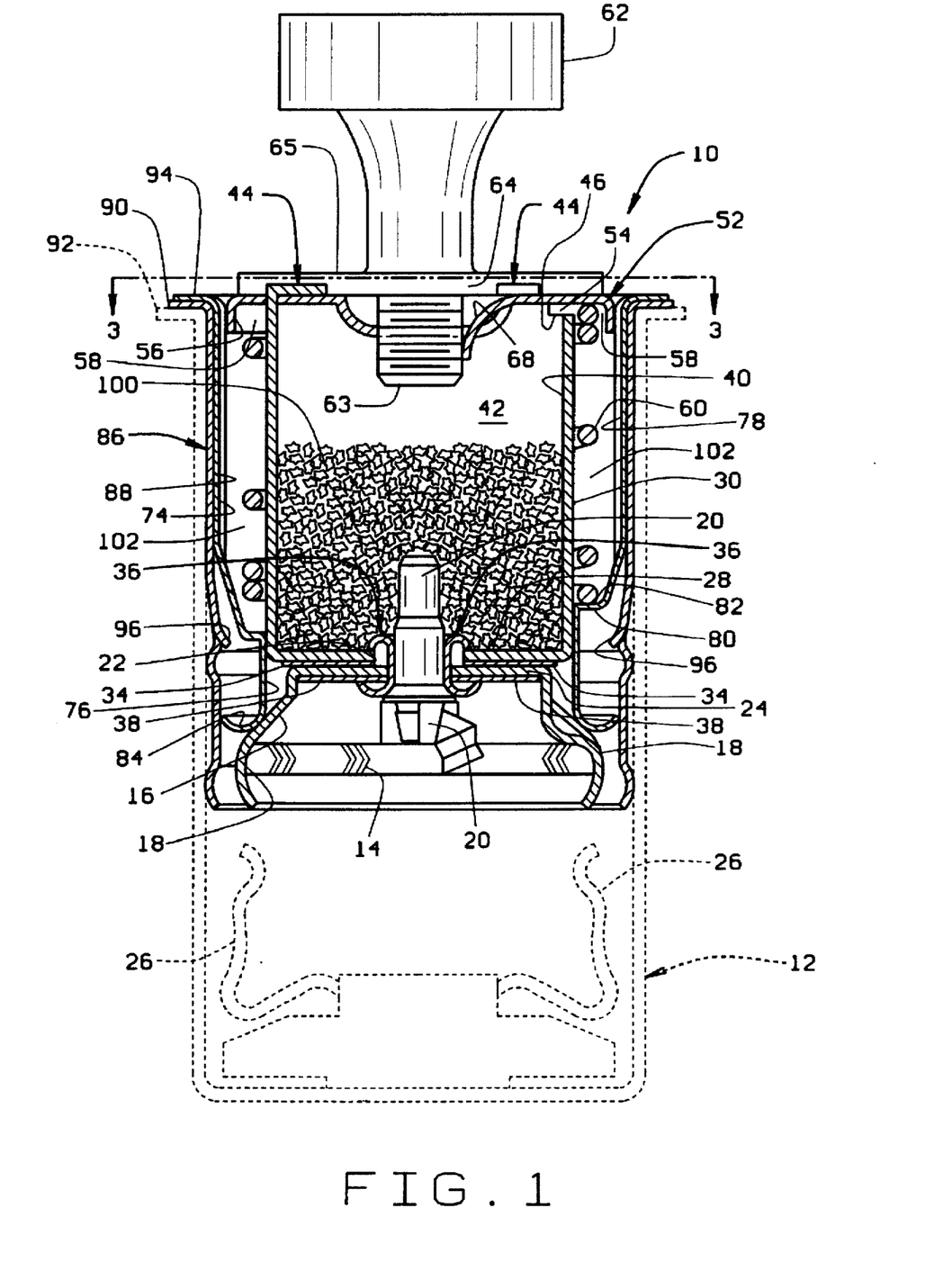
FIG. 1 is an axial sectional view of the deodorizing cigarette lighter of the present invention, illustrating the structural details of a conventional cigarette lighter ignitor plug and the location of the deodorizing agent within the tubular spacer associated with the lighter.

Referring now to FIG. 1, there is shown a cigarette lighter ignitor plug, indicated generally at 10, adapted for insertion into a similarly shaped socket or holder 12 associated with a motor vehicle (e.g., an automobile, truck, van or minivan, recreational vehicle (RV), or motor boat). The cigarette lighter ignitor plug 10 used in the present invention has a conventional, modern structure that is well know in the art. For example, U.S. Pat. No. 3,870,857, issued Mar. 11, 1975 to Horwitt et al., and assigned to Casco Products Division, Sun Chemical Corporation, Bridgeport, Conn., sets forth a typical structure for a conventional cigarette lighter. The disclosure of the '857 patent is incorporated herein by reference. In the present invention, a cigarette lighter sold by Casco Products Corporation (whose mailing address is 380 Horace Street, Bridgeport, Conn. 06610), and designated as model number 212144, preferably is used for certain motor vehicles sold by various companies, including vehicles sold by Chrysler, Dodge (except Colt® and Fiesta®), Cadillac (except Cimarron® and Deville®), American Motors (through 1987 models), Buick (Riveria® only), Lincoln/Mercury, Plymouth (except Arrow®), and Pontiac (through 1981 models). The Model 72 Casco lighter is also used for Volvo automobiles and Honda's Civic® (1978–1991 models) and Accord®. Lighter King Enterprise Company Limited of Taipei Shien, Taiwan, sells a cigarette lighter having a model number 7-960 which can be used in the aforementioned motor vehicles. Casco and Lighter King also sell cigarette lighters having model numbers of 212160 and 7-961, respectively, which can be used for certain motor vehicles sold by various companies, including vehicles sold by Buick (except Riveria®), Cadillac (Cimarron® and Deville®), Chevrolet (all cars, trucks and minvans, except Rochester type), Oldsmobile (all cars, trucks, and minivans (from 1991); Ciera (from 1982); Firenza (1982–1988); Omega (1975–1983)), and Pontiac (all cars and minivans (from 1982), except Rochester type). The particular cigarette lighters discussed above are set forth for illustrative purposes only, and any cigarette lighter having the features set forth below can be used in the present invention.

While the construction of certain components of cigarette lighters may vary slightly from manufacturer to manufacturer, the overall design and construction of the cigarette lighter ignitor plug 10 used in the present invention is substantially similar. The drawings and following disclosure generally set forth the conventional structure for cigarette lighters 10, with reference being made to various unique design features associated with particular manufacturers when appropriate. The socket 12 is shown in phantom for illustrative purposes only in FIG. 1, and forms no part of the present invention.

As shown in FIG. 1, the conventional cigarette lighter ignitor plug 10 generally includes a spiral wound heating coil element 14 disposed inside a contact cup 16. The structure of the cup 16 provides mechanical support for the heating coil 14. One end of the coil 14 is mechanically attached to a shoulder side wall 18 of the cup 16, thereby establishing electrical contact between the coil 14 and cup 16. The other end of the coil 14 is connected to a thermally conductive rod or rivet 20 extending through an opening formed in a transverse top wall 24 associated with the cup 16. When the lighter 10 is pressed into the lighter holder 12, the shouldered side wall 18 of the cup 16 is engaged by bimetallic spring contact fingers 26 associated with the socket 12. The contact fingers 26 are electrically connected to a direct current (DC) source, normally a 12 volt DC automotive battery (not shown). In this situation, the DC power is transferred from the contact fingers 26 to the cup 16, and then from the outer convolution of the heating coil 14 to the inner convolution of the heating coil 14, to the rivet 20. As will be discussed in greater detail below, the electrical path continues from the rivet 20 through a tubular body 30 (discussed below) of the cigarette lighter 10 to the socket 12, which is grounded. When the heating coil 14 is energized by the current, the heat radiated by the coil 14 causes the bimetallic contact fingers 26 to retract outwardly, thereby disengaging the contact cup 16 from the contact fingers 26. The bimetallic fingers 26 typically disengage the contact cup 16 when the temperature of the heating element 14 reaches 1500° to 2000° C.

The transverse top wall 24 of the contact cup 16 is secured to a transverse end wall 28 associated with a tubular body or spacer member 30. The end wall 28 of the tubular spacer member 30 has an opening 32 formed therein which is axially aligned with the opening in the top wall 24 of the contact cup 16. The rivet 20 extends through openings in the contact cup and spacer end wall 28 into the tubular spacer member 30 such that the rivet 20 is maintained in electrical communication with the tubular spacer member 30. As known in the art, the contact cup 16 is electrically insulated from the spacer member 30 and rivet 20 to obtain the desired electrical path discussed above.

In the Casco Model 72 lighter, electrically insulating washers 34 of deformable mica or similar insulating material are disposed between the cup top wall 24 and spacer end wall 28 (see FIG. 1). The Casco lighter also includes a grommet or eyelet 36 that is used to mechanically secure the contact cup 16 to the tubular spacer member 30. In this embodiment, a second insulating washer 38 is positioned between the eyelet 36 and the top wall 24 of the cup 16. The rivet 20 is inserted within the eyelet 36 such that the rivet 20 is maintained in electrical communication with the spacer member 30. The Casco lighter also includes a plurality of projecting nibs (not shown) formed in the top wall 24 of the contact cup 16 that cooperate with corresponding concavities (not shown) formed in the end wall 28 of the spacer member 30 to prevent rotational displacement of the contact cup 16 with respect to the spacer member 30 (see '857 patent, Col. 4, line 52 to Col. 5, line 4).

Figure 2:
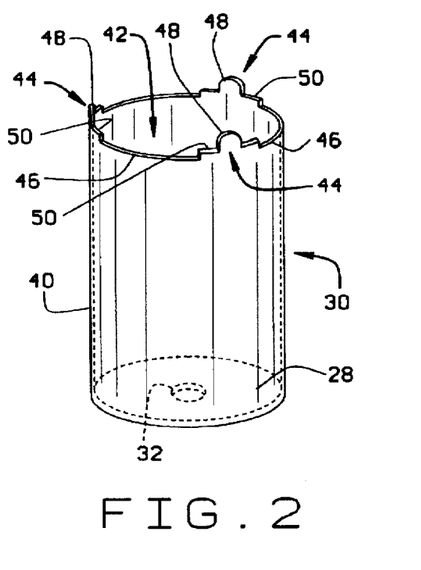
FIG. 2 is an isometric view of the tubular spacer member associated with the conventional cigarette lighter of the present invention, illustrating the lugs used to retain the cap to the spacer and the chamber wherein the deodorizing agent is stored.

In the conventional cigarette lighter 10 of the present invention, the tubular spacer member 30 generally includes a cylindrical side wall 40 extending axially upwardly from the transverse end wall 28 so as to define a cavity or chamber 42, and at least two lugs 44 integrally formed with and extending axially upwardly from a circumferential edge 46 of the side wall 30. As shown in FIG. 2, three lugs 44 extend from the edge 46 at equally spaced intervals. Each lug 44 includes a projection or tab 48 extending outwardly from a support base 50. The support base 50 has a substantially rectangular arced shape with a radius of curvature equal to the radius of the cylindrical side wall 40.

Figure 3:
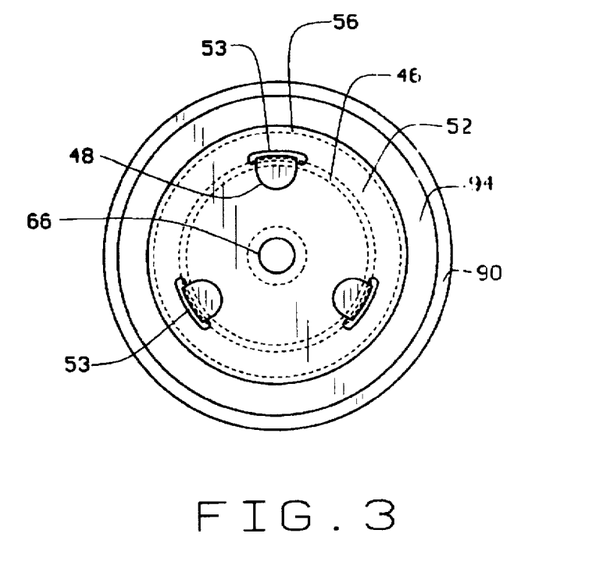
FIG. 3 is a is a sectional view taken along line 3—3 of FIG. 1.
Figure 6:
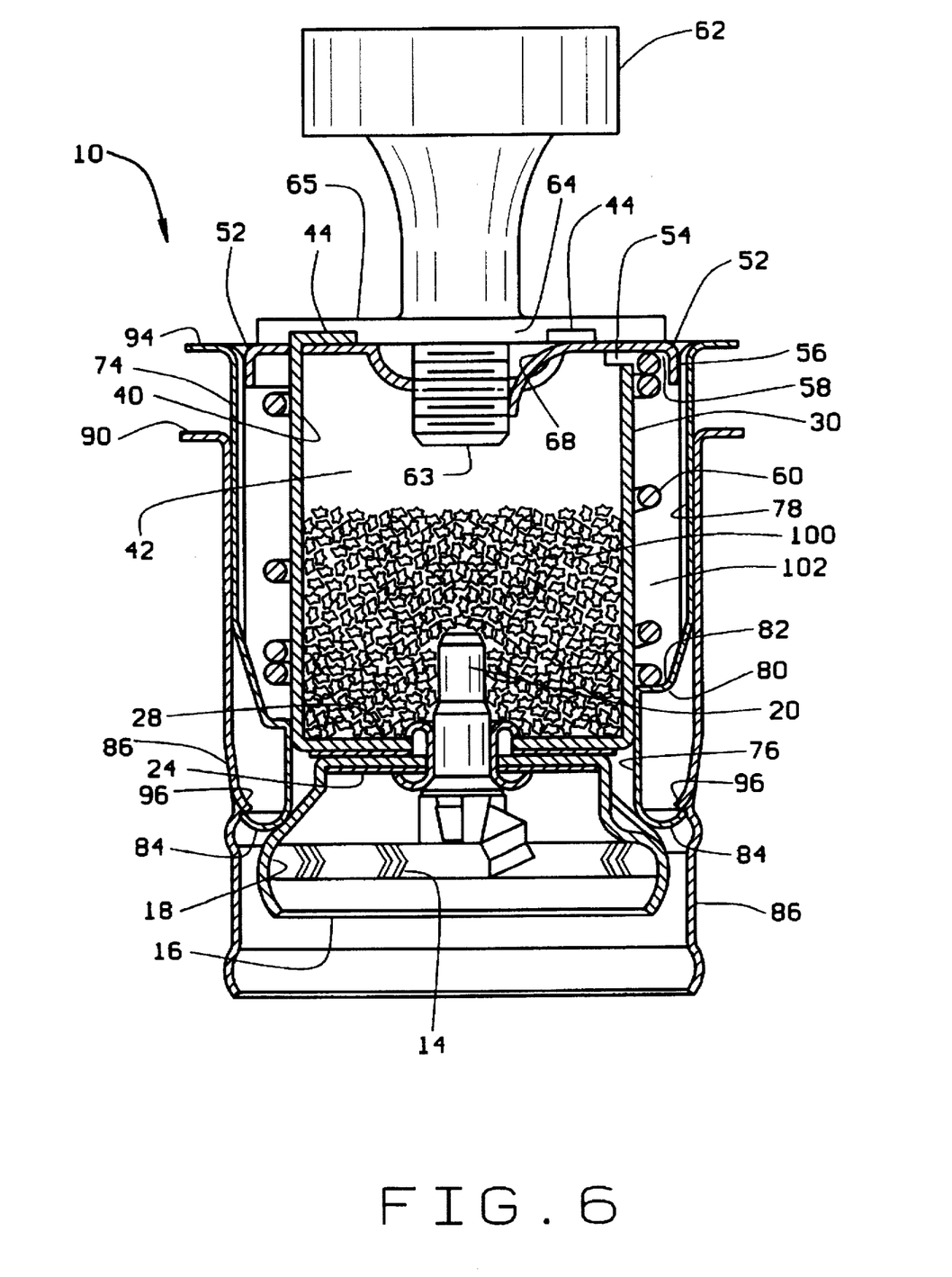
FIG. 6 is an axial sectional view of the deodorizing cigarette lighter of the present invention similar to that shown in FIG. 1, illustrating the friction sleeve in its fully retracted position.
Figure 8:
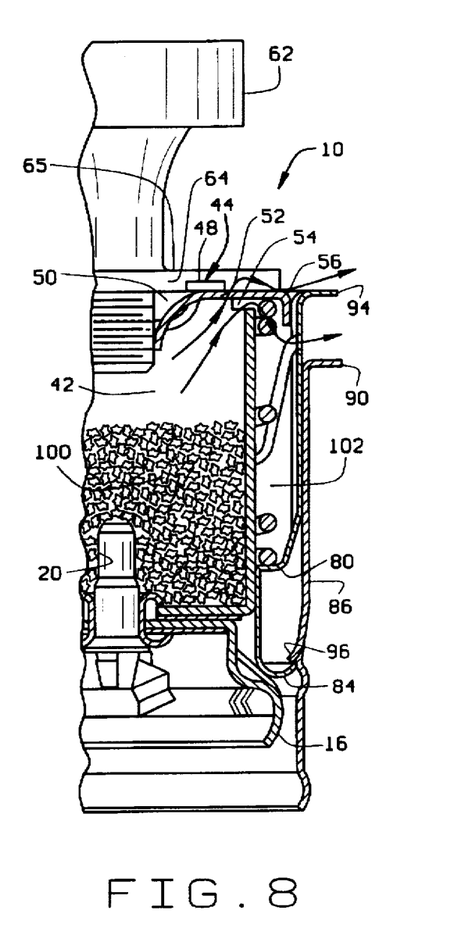
FIG. 8 is a cross sectional view taken along line 8—8 of FIG. 7, showing the vapor emission path from the spacer chamber into the vehicle passenger compartment.

Upon assembly of the cigarette lighter 10, a slotted disc shaped cap member 52 is secured to the outer end of the tubular spacer member 30 by the tabs 48. More specifically, the tabs 48 are received in annularly spaced slots 53 formed in the cap member 52, and then bent over as illustrated in FIG. 3. When the cap 52 is secured to the spacer member 30, the cap 52 is supported by the bases 50 associated with the lugs 44 as shown in FIGS. 1, 6, and 8. Passages 54 exists between the cap 52 and the circumferential edge 46 of the side wall 40 which allow for air flow from the chamber 42 when the heating coil 14 is energized and the pressure inside the chamber 42 increases. Air flow also is permitted from the chamber 42 through the slots 53 formed in the cap 52 when the heating coil 14 is energized. The diameter of the cap 52 is slightly greater than the diameter of the tubular spacer 30 (FIGS. 1, 3, 6, and 8). A downwardly extending rim 56 is integrally formed along the circumference of the cap 52, thereby defining a seat 58 between the cap 52 and spacer 30 for one end of a compression spring 60 (discussed below).

The cigarette lighter 10 also includes a knob 62 secured to and extending axially upwardly from the cap 52. The knob 62 has a threaded extension 63 which extends axially inwardly through an opening 66 formed in the cap 52. An inwardly extending pressure moth 68 is provided at the circumference of the opening 66 to securely engage the threaded knob extension 63.

An enclosure 64 is defined between the cap and a disc-shaped base 65 of the knob, as shown in FIGS. 1, 6, and 8. Alternatively, if the knob does not include base integrally formed therewith, a disc-shaped protective washer (not shown) having dimensions substantially similar to the knob base 65 is disposed between the knob and cap. In this configuration, the washer and cap define a enclosure having similar dimensions to the enclosure 64 shown in FIGS. 1, 6 and 8. When the heating coil is energized, air passes from the chamber 42, into enclosure 64 through the slots 53, and then into the atmosphere of the motor vehicle passenger compartment since abutting surfaces of the knob base 65 and the cap 52 are not secured together in an air tight fashion.

The conventional cigarette lighter 10 of the present invention further includes an inner sheath or friction sleeve 74 slidably carried on the tubular spacer member 30. The friction sleeve 74 generally includes a neck portion 76 near its inner end and a vented body portion 78 (discussed in greater detail below) extending outwardly therefrom. The diameter of the neck portion 76 is less than the diameter of the body portion 78. An annular shoulder 80 connecting the neck portion to the body portion 78 provides a seat 82 for the other end of the compression spring 60 as shown in FIGS. 1 and 6.

The compression spring 60 restricts the movement of the tubular spacer member 30 and contact cup 16 with respect to the friction sleeve 74. When the contact cup 16 is not engaged by the contact fingers 26 of the lighter socket 12, the compression spring 60 maintains the friction sleeve in a normal storage position 74 wherein a radially outwardly extending annular roll 84 of the friction sleeve 74 is maintained in abutment with the contact cup 16 due to the resilient outward axial pressure of the spring 60. When the contact cup 16 is grasped by the bimetallic contact fingers 26 during the energization of the heating coil 14, the contact cup 16 and spacer tube 30 are pressed axially inward, thereby urging the spring 60 into a compressed position. Upon the release of the contact cup 16 by the contact fingers 26, the compressed spring 60 causes the spacer 30 to snap back into its normal position within the friction sleeve 74.

Inward and outward axial movement of the friction sleeve 74 is restricted by a generally cylindrical outer sheath or ashguard 86 which is telescopically engaged with the friction sleeve 74. The ashguard 86 generally includes a substantially cylindrical side wall 88, having a radially outwardly extending annular flange 90 integrally formed at its outermost end. The flange 90 is provided for engagement with an annular flange 92 associated with the cigarette lighter socket 12 as shown in phantom in FIG. 1. The friction sleeve 74 includes a corresponding annular flange 94 which cooperates with the socket flange 92 to limit inward axial movement of the friction sleeve 74 with respect to the ashguard 86. When the lighter 10 is in a closed storage position, the friction sleeve flange 94 generally is maintained in abutment with the ashguard flange 90 as shown in FIG. 1.

As is known in the art, outward axial movement of the friction sleeve 74 with respect to the ashguard 86 is restricted by radially inwardly extending stop means 96. The stop means 96 engages the annular roll 84 of the friction sleeve 74 to prevent further retraction of the friction sleeve 74 with respect to the ashguard beyond a predetermined, desired position determined by the location of the stop means 96. In other words, the stop means 96 allows for axial movement of the friction sleeve 74 with respect to the ashguard 86 within the predetermined desired range of positions. In the Casco Model 72 lighter shown in FIG. 1, the stop means 96 includes one or more radially inwardly extending teeth or indents that limit the outward movement of the friction sleeve annular roll 84 beyond point determined by the location of the teeth. The stop means 96 used in the Casco lighter allows the friction sleeve to retract outwardly approximately 0.2" (0.5 cm). In other cigarette lighters such as the models sold by Lighter King Enterprise Co. Ltd. (not shown), movement of the friction sleeve 74 is restricted by a radially inwardly extending notch formed in the ashguard side wall that engages the annular roll 84 of the friction sleeve 74.

Figure 7:
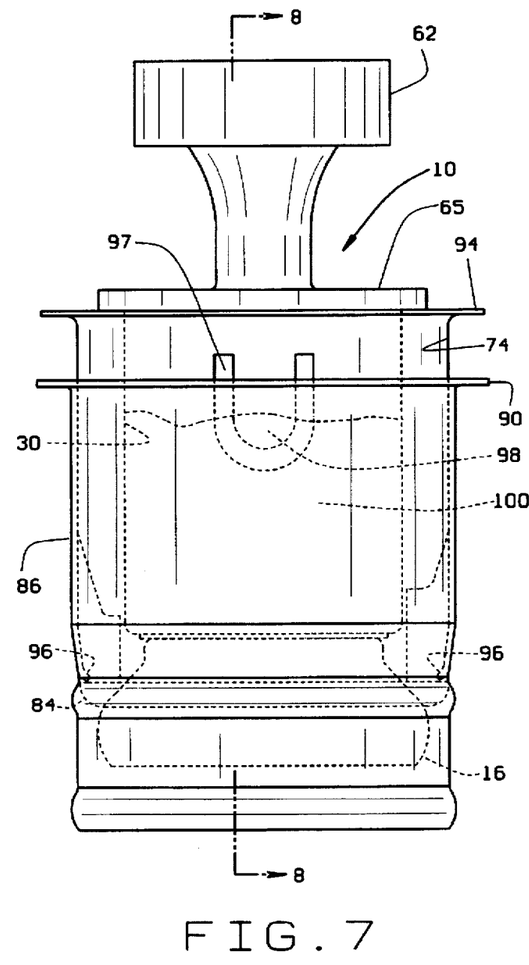
FIG. 7 is a side view of the deodorizing cigarette lighter shown in FIG. 6, illustrating the vented cylindrical body portion of the friction sleeve when the friction sleeve is in its fully retracted position.

When the contact cup 16 is released by the bimetallic contact fingers 26 after energization of the heating coil 14, the force with which the tubular spacer member 30 snaps back into its normal position with respect to the friction sleeve 74 is sufficient to cause the friction sleeve 74 to retract axially outwardly with respect to the ashguard 86. The friction sleeve 74 typically is forced into a fully retracted or open position as determined by the location of the stop means 96 associated with the ashguard 86 such that the contact cup 16 is retracted inside the ashguard 86 as shown in FIGS. 6–8. If the friction sleeve 74 is retracted to an intermediate position (i.e., less than the fully retracted position) when the compressed spring 60 recoils, the friction sleeve 74 typically is moved into the fully retracted position when a user pulls the knob 62 to remove the cigarette lighter 10 from the socket 12. This design allows tobacco ashes which form on the end of a cigar or cigarette when ignited by the heating coil 14 to fall into the ashguard 86, thereby reducing the risk of the ashes accidentally burning the user or the interior of the motor vehicle. When the cigarette lighter 10 is returned to the holder 12 after use, the friction sleeve 74 can be returned to its unretracted closed position with respect to the ashguard 86 by pressing inwardly on the knob 62 until the friction sleeve flange 94 rests on the ashguard flange 90.

Figure 4:
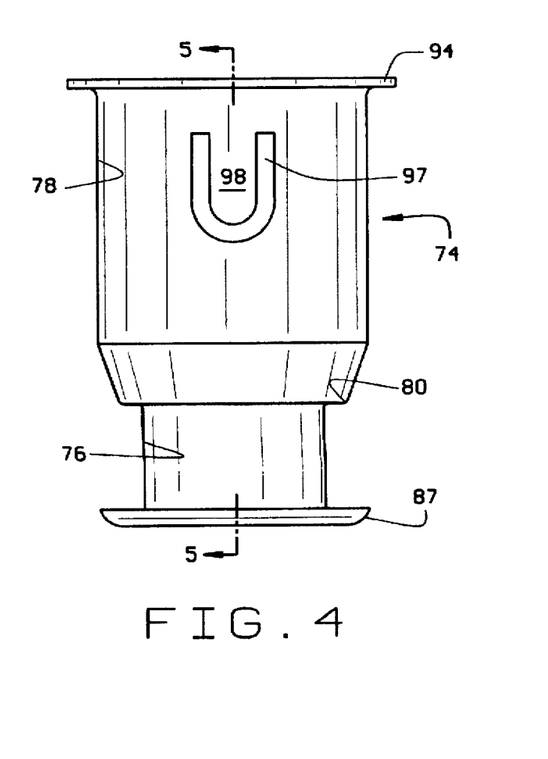
FIG. 4 is a side view of the friction sleeve used in the conventional cigarette lighter of the present invention.
Figure 5:
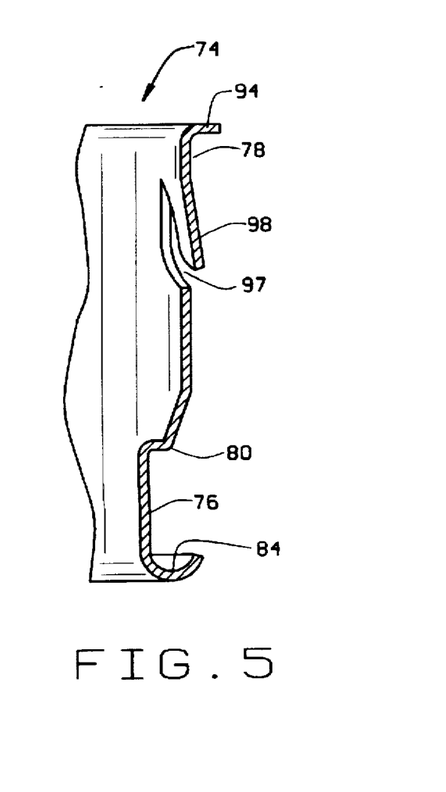
FIG. 5 is a cross sectional view taken along line 5—5 of FIG. 4.

As known in the art and disclosed in the '857 patent, friction members 98 formed in the cylindrical body portion 78 of the friction sleeve 74 are provided to hold the friction sleeve 74 at a selected axial position with respect to the ashguard 86. More specifically, the body portion 78 of the sleeve 74 is lanced, preferably at three circumferentially spaced locations, to define the generally arched shaped openings 97 and friction members 98 as shown in FIGS. 4 and 5. The friction members 98 exert pressure against the interior of the side wall 88 associated with the ashguard 86 to retain the friction sleeve 74 in a selected axial position within the predetermined allowable range of axial movement as determined by the location of the stop means 96, as discussed above. The friction members 98 are carefully calibrated to help prevent any pressure variation between the ashguard 86 and friction sleeve 74. When the friction sleeve 74 is retracted axially outwardly with respect to the ashguard 86, a portion of each friction member 98 is exposed as shown in FIGS. 7 and 8.

The Casco Model 72 lighter 10 also includes a plurality of elongated, circumferentially spaced, longitudinal ribs (not shown) formed on the cylindrical body portion 78 of the friction sleeve 74. The ribs are extend outwardly from the surface of the friction sleeve 74 to allow for slidable engagement with the interior surface of the ashguard 86, and prevent misalignment of the friction sleeve within the ashguard (see '857 patent, Col. 4, lines 5–24). Air flow is permitted between the friction sleeve and ashguard when the heating coil is energized.

The present invention takes advantage of the structural design set forth above for conventional cigarette lighters to provide a cigarette lighter that also functions as a deodorizer. The terms "deodorizer," "deodorant" and "deodorizing agent" as used throughout this disclosure should be construed broadly to include any vaporizable material that masks unpleasant odors, adsorbs or eliminates unpleasant odors, and/or adds pleasant odors to the atmosphere. In the present invention, a heat responsive deodorizing agent 100 is inserted inside the chamber 42 of the tubular spacer member 30 before the cap 52 is secured to the tubular spacer member 30 by lugs 44. The deodorizing agent 100 used in the present invention preferably is a heat resistant, nonflammable porous material known in the art such as pumice, perlite, lava rocks or vermiculite that is impregnated with a liquid water based fragrance. Certain inorganic materials known in the art such as baking soda or sodium sulfate having a heat activated fragrance adsorbed to its surface can be used as the deodorant 100. These heat resistant materials are used in the present invention since they do not pose a safety threat when heated in the manner discussed below. Perlite material having an appropriate density is used in the preferred embodiment.

To obtain the desired deodorizing agent 100 of the preferred embodiment, the porous perlite material is cleaned to remove any dirt or odor naturally associated with the material. The cleaned material is crushed or ground to a desired size, and then placed in a container with a desired amount of liquid fragrance. The mixture of perlite and fragrance is placed in a pressurized chamber or vacuum to force the fragrance into the cavities associated with the perlite material. The impregnated material is then cured before it is placed in the tubular spacer 30 associated with the cigarette lighter 10. A carrier solvent such as dipropylene glycol can be used to dilute the oil associated with the fragrance, without degrading the fragrance, thereby allowing the fragrance to more easily penetrate the perlite. However, no solvent is used in the preferred embodiment.

The deodorant 100 is preferably inserted directly into the tubular spacer 30, or can be placed in heat resistant cartridges or capsules that are then placed in the spacer chamber 42. In the preferred embodiment, between 300 and 700 granules of fragrance impregnated perlite are introduced into the inner chamber 42 of the lighter 10. The deodorant 100 is inserted in the chamber 42 either during factory assembly of the cigarette lighter before the knob 62 and cap 52 are secured to the spacer 30, or after the lighter is fully assembled using known conventional manufacturing procedures. The deodorant is inserted into a fully assembled lighter by unscrewing the knob from the lighter cap 52, inserting the deodorant 100 through the opening 66 in the cap 52, and then reassembling the lighter by reattaching the knob 62 to the cap 52. After the lighter is assembled with the deodorant contained therein, the lighter 10 is air-cleaned to remove product residue.

The deodorant used in the preferred embodiment is fragrance impregnated perlite of an appropriate sized and density, such as that sold by Huff Industries, Inc., P.O. Box 2407, Corinth, Miss. 38834 under the federally registered trademarks Vacuum Magic® and Car & Truck Magic®. Other companies which produce similar deodorants using a vermiculite resin instead of perlite include McCauley Corp. of Memphis, Tenn., and Scentex of Philadelphia, Pa.

Examples of deodorants 100 used in the present invention that are sold by Huff Industries, Inc. include 117 Vanilla Cake Vacuum Magic®, 0506 Deep Forest Car & Truck Magic®, 115 Country Garden Vacuum Magic®, and 0501 Legend Car & Truck Magic®. Based on information contained in Material Safety Data Sheets prepared by Huff Industries, Inc., the following ingredients are used in these products:

| PRODUCT | INGREDIENTS | CAS # | TLV | PEL | % |
|---|---|---|---|---|---|
| 115 | Perlite | 93763-70-73 | TWA 10MG/M3 | 15MG/M3 | 83 |
| | Benzyl Salicylate | 118-58-1 | n/a | n/a | X |
| | Benzyl Acetate | 140-11-4 | TWA 15 PPM | n/a | X |
| | Phenyl Ethyl Alcohol | 60-12-8 | n/a | n/a | X |
| 117 | Perlite | 93763-70-73 | TWA 10MG/M3 | 15MG/M3 | 83 |
| | Diethyl Phthalate | 84-66-2 | TWA 5MG/CUMTR | TWA 5MG/CUMTR | 11 |
| 0501 | Perlite | 93763-70-73 | TWA 10MG/M3 | 15MG/M3 | 83 |
| | Diethyl Phthalate | 84-66-2 | TWA 5MG/CUMTR | TWA 5MG/CUMTR | 1 |
| 0506 | Perlite | 93763-70-73 | TWA 10MG/M3 | 15MG/M3 | 83 |
| | Coumarin | 91-64-5 | n/a | n/a | X |
| | Diethyl Phthalate | 84-66-2 | TWA 5MG/CUMTR | TWA 5MG/CUMTR | 1 |

Other ingredients included in these products are considered trade secrets by Huff Industries, Inc., and some may be natural oils and juices found in foods. There is no known harmful effects to animals or humans based on these mixtures. Each of these products has an evaporation rate slower than butyl acetate. The products are white or off white granules with characteristics odor. The perlite used in these products is a amorphous silicate (CAS #93763-70-3), and may contain less than 0.1% crystalline silica.

When the cigarette lighter 10 is inserted into the contact fingers 26 of the socket 12 to energize the heating coil 14, the thermally conductive rivet 20 transfers the heat from the coil 14 to the spacer member 30 (as discussed above), thereby activating the heat-sensitive deodorizing agent 100 stored therein. Typically, temperatures inside the chamber 42 exceed 500° F. When the temperature of the tubular spacer member 30 exceeds a certain level, the deodorizing material 100 emits a vapor having a pleasant aromatic scent. The fragrance used in the deodorant 100 is not injured by heat. As the pressure inside the chamber increases and the vapor expands, a limited quantity of the vapor passes from the chamber 42 through the passages 54 between the cap 52 and the tubular spacer member 30 into the cavity 102 delimited by the cap 52, the side wall of the spacer 30 and the friction sleeve 74. Varying the total number of lugs, or the width and/or height of the base 50 of the lugs 44 changes the dimensions of the passages 54, thereby changing the amount of vapors that escape from the chamber 42.

As mentioned above, when the contact cap 16 is released by the bimetallic contact fingers 26 after the heating coil 14 is heated to a red glow, the friction sleeve 74 is retracted axially outwardly due to force associated with the recoiling compression spring 60. When the friction sleeve 74 is retracted, a portion of the friction members 98 and associated openings 97 formed in the cylindrical body portion 78 of the friction sleeve 74 are exposed. The scented vapors then flow from the cavity 102 through the exposed openings 97 into the atmosphere of the passenger compartment of the vehicle as shown in FIGS. 7 and 8. The dimensions and shape of the vents or openings 97 formed in the body portion 78 of the friction sleeve 74 can be varied to allow for increased or decreased vapor flow into the atmosphere of the passenger compartment. Similarly, the location of the stop means can be adjusted to allow for greater or lesser retraction of the friction sleeve 74 with respect to the ashguard 86. The user can also vary the rate of ventilation of the deodorizing agent 100 by inwardly pressing or outwardly pulling the knob to vary extent to which the openings 97 are exposed to the atmosphere.

Vapors also enter into the vehicle passenger compartment from the cavity 102 by flowing between the ashguard 86 and the friction sleeve 74 as the heating coil is energized, and when the friction sleeve 74 is in a retracted position. Additional vapors emitted by the deodorant 100 escape the chamber 42 through the slots 53 into the enclosure 64, and then into the passenger compartment when the vapors expand inside the chamber 42, as discussed above. The quantity of vapors flowing into the enclosure 64 can be varied for increasing or decreasing the dimensions of the slots 53. The heated air carries the aroma of the vaporized fragrance to the vehicle interior, where it is circulated by normal vehicle interior ventilation.

Some vapors are retained in the chamber 42 when the heating coil 14 is energized and the vapors expand. Moisture from the vapor inside the chamber 42 forms condensate at the top of the chamber in the vicinity of the cap due to the effects of gravity. The retained vapors and moisture are absorbed or adsorbed by the deodorizing agent 100 when the pressure inside the chamber 42 is equalized (decreases) as the heating coil 14 cools down. The amount of fragrant vapor producing condensate that is subsequently reabsorb by the deodorant is proportional to the number of times the deodorizing cigarette lighter 10 is repeatedly activated in a relatively short period of time which does not allow for normal cooling. Repeated activation does not produces an excessive amount of vapor as any vapor present in the chamber 42 accelerates the cooling process within the chamber 42. Repeated use results in a more pronounced aroma within the vehicle.

The deodorant emits a fragrant scent as long as the pressure inside the chamber is not equalized. The deodorant also adsorbs, eliminates and masks unpleasant odors when circulation is permitted through the chamber 42, even after the chamber pressure is equalized. Therefore, the deodorant can provide odor elimination (even when no fragrant scent is desired) when the friction sleeve 74 is maintained in its retracted position allowing for air circulation through the chamber 42.

The perlite deodorizing agent 100 used in the preferred embodiment continues to emit a pleasant fragrance when repeatedly used for at least six months. The first time fragrant emissions are desired, the lighter should be activated approximately three times, with one to two minutes between each activation. This eliminates the "normal new metal smell" from the lighter 10, and activates the aroma and odor eliminating capabilities of the lighter 10. To obtain a more noticeable scent within the passenger car, the lighter can be depressed and re-energized approximately two to three minutes after an initial energization. As mentioned above, the deodorizing cigarette lighter eliminates common vehicle odors without a readily detectable aroma as long as the lighter is left in its retracted position with the vents 97 exposed. When the lighter is in its closed or storage position, the deodorant remains dormant until the next activation of the lighter.

When the fragrance has diminished to an unappreciable level, the deodorizing agent 100 contained in the spacer chamber 42 can be replaced by unscrewing the knob 62 from the cap 52, prying the tabs 48 associated with the lugs 44 on the tubular spacer 30 into a upright position, removing the cap 52 from the spacer 30, replacing the spent deodorant 100 with new deodorant 100, and then reassembling the lighter 10 by reattaching the cap 52 and knob 62. The cigarette lighter can be disassembled and reassembled in this manner to initially insert the deodorant into the chamber 42, if desired; however, this method of inserting the deodorant is not preferred since the tabs 48 can be weakened when pried into an upright position and may break off of the spacer. Alternatively, the entire deodorizing cigarette lighter 10 preferably is replaced when the fragrance is exhausted since the cost of the lighter 10 is relatively inexpensive when compared with other vehicle deodorants currently available. The cost of the deodorizing cigarette lighter 10 is kept at a minimum since the deodorizing lighter 10 is easily and inexpensively manufactured. No special tooling or molding processes are needed to construct the cigarette lighter 10 that accommodates the deodorizing agent 100 used in the present invention.

The foregoing description is set forth only for illustrative purposes only and is not meant to be limiting. Numerous variations, within the scope of the appended claims will be apparent to those skilled in the art in light of the foregoing description and accompanying drawings.

Having thus described the invention, what is claimed and desired to be secured by Letters Patent is:

1. A deodorizing cigarette lighter for use in a motor vehicle comprising, in combination:
    a cigarette igniting unit including a plug body, a cap having one or more slots formed therein attached to one end of the body plug, and an electric heating element disposed at an opposite end of the plug body, said heating element being maintained in a heat transfer relationship with the plug body upon energization of the heating element; and
    a heat responsive, nonflammable deodorant stored inside said plug body such that said deodorant is maintained in a heat transfer relationship with the plug body, said deodorant emitting a fragrant vapor into the vehicle interior through the slots in the cap upon energization of the heating element.

2. The deodorizing cigarette lighter of claim 1 wherein said deodorant consists of perlite granules impregnated with a liquid fragrance.

3. The deodorizing cigarette lighter of claim 1 wherein a plurality of passages are formed between the plug body and the cap that allow for flow of vapors from the deodorant into the vehicle interior.

4. The deodorizing cigarette lighter of claim 1 wherein said cigarette igniting unit includes a vented friction sleeve slidably carried on the plug body having at least one opening formed therein that allows for flow of vapors from the deodorant into the vehicle interior.

5. The deodorizing cigarette lighter of claim 4 wherein said cigarette igniting unit further includes an ashguard telescopically engaged with the vented friction sleeve.

6. The deodorizing cigarette lighter of claim 5 wherein said vented friction sleeve includes a body portion having at least one opening formed therein and an annular flange extending radially outwardly from its outermost end, and a neck portion extending axially inwardly from the body portion having an annular roll extending radially outwardly from its innermost end.

7. The deodorizing cigarette lighter of claim 6 wherein said ashguard includes means extending radially inwardly for restricting outward axial movement of the friction sleeve upon engagement with the annular roll associated with the neck portion of the friction sleeve, at least a portion of the openings associated with the body portion of the friction sleeve being exposed when annular roll is engaged by the inwardly extending restricting means.

8. The deodorizing cigarette lighter of claim 7 wherein said ashguard further includes means extending radially outwardly for restricting inward axial movement of the friction sleeve upon engagement with the annular flange associated with the body portion of the friction sleeve.

9. A deodorizing cigarette lighter for use in a motor vehicle comprising, in combination:
    a cigarette igniting unit having a standard conventional structure including a plug body and an electric heating element disposed at one end of the body, said heating element being maintained in a heat transfer relationship with the plug body upon energization of the heating element; and
    a heat responsive, nonflammable deodorant stored inside said plug body such that said deodorant is maintained in a heat transfer relationship with the plug body, said deodorant emitting a fragrant vapor into the vehicle interior upon energization of the heating element;
    said cigarette igniting unit further including a friction sleeve slidably carried on the plug body having a vented body portion with at least one opening formed therein, and a substantially cylindrical ashguard slidably engaged with the friction sleeve having means for limiting outward axial retraction of the friction sleeve with respect to the ashguard to a predefined range of positions, the opening of the friction sleeve being partially exposed to the atmosphere when the friction sleeve is maintained in a retracted position, thereby allowing for flow of the fragrant vapor emitted by the deodorant upon energization of the heating element from the plug body through the exposed portion of the opening into the vehicle interior.

10. The deodorizing cigarette lighter of claim 9 wherein the tubular plug body includes a transverse end wall, a cylindrical side wall extending axially outwardly from the end wall so as to define a chamber therebetween, and at least two lugs extending axially outwardly from the side wall, said deodorant being disposed inside the chamber.

11. The deodorizing cigarette lighter of claim 4 wherein the cigarette igniting unit further includes a cap having at least two slots formed therein adapted for receiving a portion of the lugs therethrough, the portion of the lugs received through the slots being bent over upon assembly of the lighter to attach the cap to the plug body.

12. The deodorizing cigarette lighter of claim 11 wherein a plurality of passages are defined between the cap and the plug body, allowing for flow of vapors emitted by the deodorant from the chamber through the exposed opening of the friction sleeve and the slots formed in the cap into the vehicle interior.

13. A deodorizing cigarette lighter comprising, in combination:

a tubular plug body including a transverse end wall, a cylindrical side wall extending axially outwardly from the end wall so as to define a chamber therebetween, and at least two lugs extending axially outwardly from the side wall;

a cap having at least two slots formed therein adapted for receiving a portion of the lugs therethrough, the portion of the lugs received through the slots being bent over upon assembly of the lighter to attach the cap to the plug body;

a knob attached to the cap;

a contact cup aligned with the end wall of the plug body, the contact cup being electrically insulated from the plug body;

a heating coil disposed inside the contact cup, thermally conductive means connected to one end of the heating coil for transferring heat from the heating coil to the plug body upon energization of the heating coil;

a vented friction sleeve slidably carried on the plug body;

an ashguard telescopically engaged with the friction sleeve; and a heat responsive, nonflammable deodorant disposed inside the chamber associated with the plug body in a heat transfer relationship with the plug body, the deodorant generating a fragrant vapor upon energization of the heating coil, the vapor being exuded from the chamber into the atmosphere through passages formed between the cap and plug body, the slots formed in the cap and the vented friction sleeve.

14. A deodorizing cigarette lighter for use in a motor vehicle comprising, in combination:

a plug body having a chamber formed therein;

a slotted cap attached to one end of the plug body;

a knob attached to the cap;

a contact cup at the other end of the plug body;

an electric heating element disposed inside the contact cup, one end of said heating element being maintained in thermal communication with said contact cup;

a heat transfer means for transferring heat generated by the heating element to the plug body upon energization of the heating element;

a vented friction sleeve slidably carried on the plug body;

an ashguard telescopically engaged with the vented friction sleeve; and heat responsive deodorizing agents stored inside the chamber of the plug body, said deodorizing agents emitting a fragrant scent into the vehicle interior upon energization of the heating element.

15. The deodorizing cigarette lighter of claim 14 wherein a plurality of passages are formed between the body and the cap that allow for flow of vapors from the chamber into the vehicle interior.

16. The deodorizing cigarette lighter of claim 15 wherein said vented friction sleeve includes a body portion having at least one opening formed therein and an annular flange extending radially outwardly from its outermost end, and a neck portion extending axially inwardly from the body portion having an annular roll extending radially outwardly from its innermost end.

17. The deodorizing cigarette lighter of claim 16 wherein said ashguard includes means extending radially inwardly for restricting outward axial movement of the friction sleeve upon engagement with the annular roll associated with the neck portion of the friction sleeve, at least a portion of the openings associated with the body portion of the friction sleeve being exposed when annular roll is engaged by the inwardly extending restricting means.

18. The deodorizing cigarette lighter of claim 17 wherein said ashguard further includes means extending radially outwardly for restricting inward axial movement of the friction sleeve upon engagement with the annular flange associated with the body portion of the friction sleeve.

19. A deodorizing cigarette lighter for use in a motor vehicle comprising, in combination:

(a) a cigarette igniting unit having a standard conventional structure including:

(i) a tubular plug body, (ii) an electric heating element disposed at one end of the plug body, said heating element being maintained in a heat transfer relationship with the plug body upon energization of the heating element, (iii) a vented friction sleeve slidably carried on the plug body having at least one opening formed therein, (iv) a compression spring coil encircling the plug body, the coil being supported at one end by an annular portion of the cap extending beyond the plug body and at the other end by a radially inwardly extending portion of the friction sleeve, and (v) an ashguard telescopically engaged with the vented friction sleeve, said friction sleeve having an open retracted position and a normally closed storage position with respect to said ashguard, said friction sleeve being urged into the open retracted position upon energization of the heating element by the compression coil, at least a portion of said opening in said friction sleeve being exposed when the friction sleeve is maintained in the open retracted position; and (b) a heat responsive, nonflammable deodorant stored inside said plug body such that said deodorant is maintained in a heat transfer relationship with the plug body, said deodorant emitting a fragrant vapor upon energization of the heating element, the fragrant vapor passing into the atmosphere through the exposed opening associated with the vented friction sleeve when the friction sleeve is maintained in the open retracted position.

20. A deodorizing cigarette lighter for use in a motor vehicle comprising, in combination:

a cigarette igniting unit including a plug body and an electric heating element disposed at one end of the plug body, said heating element being maintained in a heat transfer relationship with the plug body upon energization of the heating element; and a heat responsive, nonflammable deodorant comprising solid granular material impregnated with a liquid fragrance stored inside said plug body such that said deodorant is maintained in a heat transfer relationship with the plug body, said deodorant emitting a fragrant vapor into the vehicle interior upon energization of the heating element.

* * * * *